Patented Mar. 19, 1935

1,994,622

UNITED STATES PATENT OFFICE 1,994,622

PROCESS OF PREPARING HIGH MOLECULAR ANTHRAQUINONE DERIVATIVES

Robert E. Schmidt and Curt Bamberger, Wuppertal-Elberfeld, Germany, assignors to General Aniline Works, Inc., New York, N. Y., a corporation of Delaware No Drawing. Application November 5, 1931, Serial No. 573,296. In Germany November 7, 1930

8 Claims. (Cl. 260—60)

The present invention relates to a process of preparing high molecular anthraquinone derivatives, which probably belong to the group of trianthraquinonylamines, and to the new products obtainable by said process.

The process of the invention is by causing an oxidizing agent possessing oxidizing action in dilute sulfuric acid solution to act on alpha-aminoanthraquinone or on alpha-alkylaminoanthraquinone or substitution products thereof possessing a free para-position to the amino- or alkylamino group. The reaction is performed in dilute sulfuric acid solution, the sulfuric acid being advantageously applied in a strength between about 30–60%. The best results are obtained with a sulfuric acid of 40–50% strength. Reaction already performs at low temperatures, say about 0° C. or even less. Higher temperatures tend to accelerate the reaction but the temperature should not exceed about 50° C. The best results generally are obtained when working at about 15–25° C., it means at about room temperature.

As to the oxidizing agent, we prefer to apply manganese dioxide but other oxidizing agents possessing oxidizing action in dilute sulfuric acid are likewise operable. The course of the reaction is rather independent on the amount of the oxidizing agent applied. Generally, we apply the oxidizing agent in an amount at least sufficient to remove two hydrogen atoms from the alpha-aminoanthraquinone used. Somewhat larger amounts (a surplus of 10–30% by weight, for example) give the best results. Substantially larger amounts are not obnoxious, but unnecessary, and when using substantially smaller amounts, part of the aminoanthraquinone will remain unattacked.

When working in the manner above described dark colored, generally black, high molecular reaction products are obtained, dissolving in concentrated sulfuric acid with a yellow to brown coloration. They most probably contain a reactive quinonoid linkage, which can easily be removed by reduction. When, for example, a reducing agent possessing reducing properties in dilute sulfuric acid, such as stannous chloride or sulfurous acid, is added to the reaction mixture obtained as described above, reduction easily occurs. The compounds obtained after reduction are likewise dark colored products and are very difficultly soluble in the usual organic solvents. Generally, they dissolve in concentrated sulfuric acid with green to blue colorations, which colorations change at the addition of formaldehyde.

According to applicants' investigations the new compounds probably are trianthraquinonylamines containing an amino or alkylamino group.

In case of starting with alpha-aminoanthraquinone itself, the course of the reaction is presumed to be as follows:—

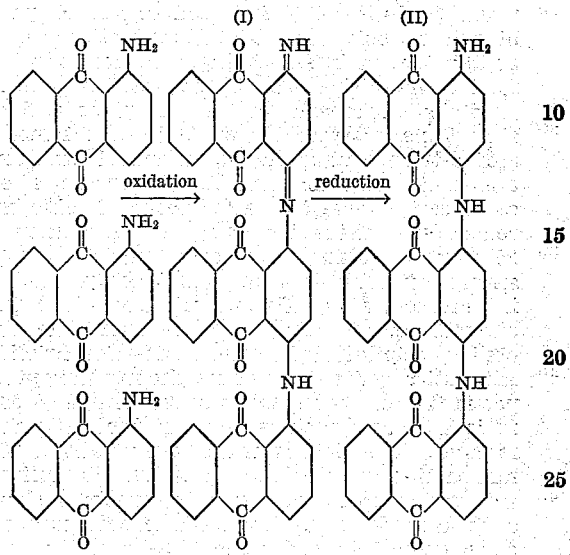

Formula I probably corresponds to the quinonoid compound being formed first, whereas Formula II is the formula of the compound obtained after reduction. Applicants have synthesized the compound of the Formula II by condensing 1-amino-4.4'-dianthraquinonylamine according to usual methods with 1-benzoylamino-4-chloroanthraquinone and then saponifying the benzoylamino group. The compound thus obtained was identical in its properties to the compound obtained from alpha-aminoanthraquinone according to the directions given in this application. Since 1-methyl- or -ethyl-aminoanthraquinone, 1-amino-8-chloroanthraquinone and otherwise substituted 1-amino- or 1-alkylamino-anthraquinones, when treated in correspondence with the process of the present application yield reaction products possessing similar properties to the products marked I and II in the above equation, it is to be presumed that also in these cases reaction performs with the formation of at first quinonoid derivatives of amino-or alkylamino-trianthraquinonyl-amines, which are then reduced to the corresponding trianthraquinonyl amines. It should be pointed out, however, that applicants could not decide with certainty up to date, whether besides or instead of the trianthraquinonylamine derivatives mentioned, other, perhaps still higher molecular reaction products are formed in some cases. Applicants' invention, therefore, is not limited to the manufacture of amino- or alkylamino-trianthraquinonylamines, but it is intended to embrace quite generally the reaction of 1-amino- or -alkylaminoanthraquinones with a free 4-position with oxidizing agents as set out before and to the new reaction products obtainable thereby.

The new products partly possess the character of dyestuffs and, furthermore, are valuable intermediates for the manufacture of other dyestuffs.

The following examples illustrate the invention, without, however, restricting it thereto, the parts being by weight:—

Example 1

22.3 parts of alpha-aminoanthraquinone are dissolved in 408 parts of sulfuric acid (98% $H_2SO_4$ content) and caused to separate in a finely divided form by dilution with 592 parts of water. A suspension consisting of 12 parts of finely divided pyrolusite (85% $MnO_2$ content) in 100 parts of sulfuric acid (40% $H_2SO_4$ content) is added at 18° C. with brisk stirring. The temperature rises slowly to about 23° C. The starting material gradually disappears and in its place a dark, almost black crystalline precipitate of 1-monoamino-trianthrimide in the quinonoid form separates. When after some time no further alteration can be detected (after about 20 minutes), reduction is effected by means of a solution of 20 parts of stannous chloride in 75 parts of strong hydrochloric acid. The black precipitate is converted almost instantaneously into a well crystallized, uniformly greyish-green slate colored precipitate of monoamino-trianthrimide. After stirring for a short time, the resulting product is filtered by suction, washed with 40% sulfuric acid and then isolated in the customary manner. The yield is almost quantitative. The monoamino-trianthrimide dissolves in sulfuric acid with a green coloration, the spectrum shows a band in the red. Borosulfuric acid causes a color change towards blue, slowly in the cold, but quickly on heating. The new product probably corresponds to the formula:—

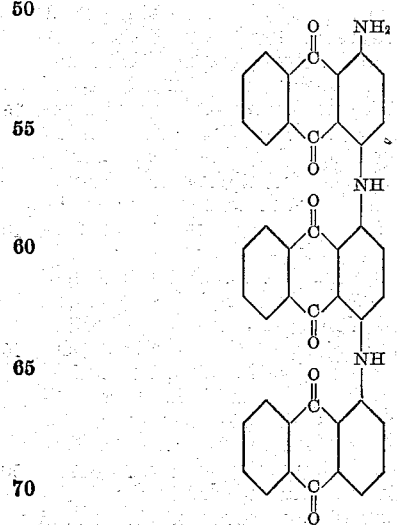

The color of its solution in sulfuric acid of 90% strength becomes substantially more bluish at the addition of formaldehyde.

Example 2

5.15 parts of 1.8-aminochloroanthraquinone are converted into a finely divided paste in sulfuric acid (50% $H_2SO_4$ content) by dissolving in 102 parts of sulfuric acid (98% $H_2SO_4$ content) and diluting with 98 parts of water. The resulting suspension is oxidized at 20° C. by means of 3 parts of finely divided pyrolusite (85% $MnO_2$ content) suspended in 50 parts of sulfuric acid (50% $H_2SO_4$ content). After about 10 minutes the disappearance of the starting material can be confirmed on microscopic examination, and after 15 minutes, reduction is effected by means of a solution of 4 parts of stannous chloride in 15 parts of strong hydrochloric acid, previously diluted with 50 parts of water. A beautiful, uniformly greyish-green, crystalline precipitate can now be seen under the microscope. The product isolated in the customary manner, differs only slightly in its properties from that described in Example 1, and is likewise obtained in almost quantitative yield:—It is obviously the monoamino-trichloro-trianthrimide of the probable formula:—

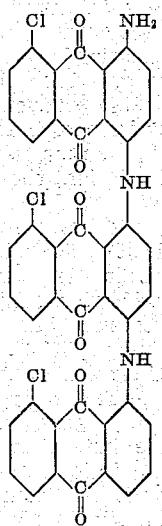

The color of its solution in sulfuric acid of 90% strength becomes substantially more bluish on the addition of formaldehyde.

Example 3

2.4 parts of 1-N-methylaminoanthraquinone are dissolved in 51 parts of sulfuric acid (98% $H_2SO_4$ content) diluted with 49 parts of water and cooled to 20° C. The methylaminoanthraquinone separates as sulfate in colorless needles. The resulting suspension is mixed with 1.2 parts of finely divided pyrolusite (85% $MnO_2$ content) suspended in 20 parts of sulfuric acid (50% $H_2SO_4$ content). The suspension slowly becomes green and the white needles of 1-methylaminoanthraquinone sulfate disappear gradually. After 1½ hours reduction is effected by means of a solution of 4 parts of stannous chloride in 12 parts of strong hydrochloric acid, previously diluted with 25 parts of water. The product is then boiled with 300 parts of water, filtered, washed until neutral and the crude product boiled with methylalcohol, until the latter is no longer colored.

The product dissolves in sulfuric acid with a bottle green coloration. On heating with borosulfuric acid the coloration of the solution becomes dull violet.

Instead of the starting materials mentioned in the above examples other 1-amino- or -alkylamino-anthraquinones, such as 1-amino-5-chloroanthraquinone, 1-amino-8-bromoanthraquinone, 1-amino-6-chloroanthraquinone, 1-amino-7-chloroanthraquinone, 1-amino-5-hydroxyanthraquinone, 1-amino-6-methoxyanthraquinone, 1-aminoanthraquinone-5- or -8-sulfonic acid etc. may be applied with the result that reaction products similar to those described in the examples, are obtained.

Likewise, instead of the pyrolusite, other oxidizing agents possessing oxidizing action in dilute sulfuric acid may be used, such as other heavy metal dioxides (lead oxide, for example) furthermore, potassium ferric cyanide, chromic acid, vanadic acid etc.

We claim:—

1. In the process of preparing high molecular anthraquinone derivatives containing an amino- or alkylamino group the step which comprises reacting upon 1-aminoanthraquinone, which may be substituted at the nitrogen atom by an alkyl group and in the nucleus by halogen atoms, hydroxy-, alkoxy- or sulfonic acid groups in another position than the 4-position, in dilute sulfuric acid solution with an oxidizing agent possessing oxidizing properties in said solution, at a temperature between about 0-50° C.

2. In the process of preparing high molecular anthraquinone derivatives containing an amino- or alkylamino group the step which comprises reacting upon 1-aminoanthraquinone, which may be substituted at the nitrogen atom by an alkyl group and in the nucleus by halogen atoms or sulfonic acid groups in another position than the 4-position, in dilute sulfuric acid solution of between about 30-60% strength with an oxidizing agent possessing oxidizing properties in said solution, at a temperature between about 0-50° C.

3. In the process of preparing high molecular anthraquinone derivatives containing an amino- or alkylamino group the step which comprises reacting upon 1-aminoanthraquinone, which may be substituted at the nitrogen atom by an alkyl group and in the nucleus by halogen atoms or sulfonic acid groups in another position than the 4-position, in dilute sulfuric acid solution of 40-50% strength with manganese dioxide at about room temperature.

4. Process which comprises reacting upon 1-amino-anthraquinone, which may be substituted at the nitrogen atom by an alkyl group and in the nucleus by halogen atoms, hydroxy-, alkoxy-, or sulfonic acid groups in another position than the 4-position, in dilute sulfuric acid solution of between about 30-60% strength with an oxidizing agent possessing oxidizing properties in said solution, at a temperature between about 0-50° C., and adding to the reaction mixture, after reaction is complete, a reducing agent possessing reducing properties in dilute sulfuric acid solution.

5. The new compounds being obtainable in accordance with the process claimed in claim 4, said compounds being probably trianthraquinonylamine derivatives containing an amino- or alkylamino group, forming dark products nearly insoluble in the usual organic solvents, dissolving in concentrated sulfuric acid with green to blue colorations, which change at the addition of formaldehyde.

6. Process which comprises reacting upon 1-amino-anthraquinone, which may be substituted at the nitrogen atom by an alkyl group and in the nucleus by halogen atoms or sulfonic acid groups in another position than the 4-position, in dilute sulfuric acid solution of 40-50% strength with manganese dioxide at about room temperature, and adding to the reaction mixture, after reaction is complete, a reducing agent possessing reducing properties in dilute sulfuric acid solution.

7. Process which comprises reacting upon a compound of the formula:—

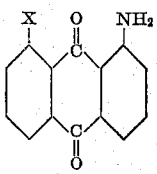

wherein X means hydrogen or halogen, with manganese dioxide in sulfuric acid solution of 40-50% strength at about room temperature and adding to the reaction mixture, after reaction is complete, a reducing agent possessing reducing properties in dilute sulfuric acid solution.

8. The new compounds of the formula:—

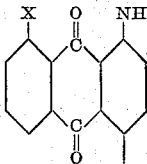
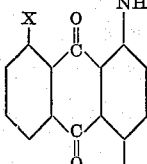
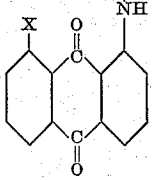

wherein the X's jointly stand for hyrogen or halogen, said compounds forming dark products nearly insoluble in the usual organic solvents, dissolving in concentrated sulfuric acid with green colorations, turning substantially more bluish upon the addition of formaldehyde.

ROBERT E. SCHMIDT.
CURT BAMBERGER.